US011618830B2

(12) United States Patent
Lubkoll

(10) Patent No.: US 11,618,830 B2
(45) Date of Patent: Apr. 4, 2023

(54) ACYLATED STARCH DERIVATIVES AND USE THEREOF

(71) Applicant: Rhodia Acetow GmbH, Freiburg (DE)

(72) Inventor: Jana Lubkoll, Freiburg (DE)

(73) Assignee: Rhodia Acetow GmbH, Freiburg (DE)

( * ) Notice: Subject to any disclaimer, the term of this patent is extended or adjusted under 35 U.S.C. 154(b) by 190 days.

(21) Appl. No.: 16/489,203

(22) PCT Filed: Feb. 20, 2018

(86) PCT No.: PCT/EP2018/054113
§ 371 (c)(1),
(2) Date: Aug. 27, 2019

(87) PCT Pub. No.: WO2018/158109
PCT Pub. Date: Sep. 7, 2018

(65) Prior Publication Data
US 2021/0309871 A1    Oct. 7, 2021

(30) Foreign Application Priority Data

Feb. 28, 2017   (EP) .................................. 17158413
Mar. 23, 2017   (EP) .................................. 17162614

(51) Int. Cl.
| | | |
|---|---|---|
| C09D 7/65 | (2018.01) | |
| C08B 31/04 | (2006.01) | |
| C09D 11/14 | (2006.01) | |
| C09D 163/00 | (2006.01) | |
| C08L 3/06 | (2006.01) | |
| C09D 103/06 | (2006.01) | |
| C08B 30/20 | (2006.01) | |

(52) U.S. Cl.
CPC ............... *C09D 7/65* (2018.01); *C08B 30/20* (2013.01); *C08B 31/04* (2013.01); *C08L 3/06* (2013.01); *C09D 11/14* (2013.01); *C09D 103/06* (2013.01); *C09D 163/00* (2013.01)

(58) Field of Classification Search
CPC ........ C09D 7/65; C09D 11/14; C09D 103/06; C08B 31/04; C08B 30/20; C08L 3/06
See application file for complete search history.

(56) References Cited

U.S. PATENT DOCUMENTS

| | | | |
|---|---|---|---|
| 4,011,392 A | 3/1977 | Rudolph et al. | |
| 4,095,992 A | 6/1978 | Rudolph et al. | |
| 2004/0152857 A1 | 8/2004 | Ohnishi et al. | |
| 2010/0036038 A1* | 2/2010 | Rodgers | C08L 23/22 525/213 |
| 2010/0249315 A1* | 9/2010 | Morita | C08F 220/1804 524/539 |

FOREIGN PATENT DOCUMENTS

| | | |
|---|---|---|
| CN | 101896287 A | 11/2010 |
| CN | 101981062 A2 | 2/2011 |
| CN | 102477100 A | 5/2012 |
| CN | 102753583 A | 10/2012 |
| CN | 105829353 A | 8/2016 |
| EA | 009723 B1 | 2/2008 |
| EP | 0736545 A2 | 10/1996 |
| EP | 1 447 415 A1 | 8/2004 |
| EP | 1447415 A1 | 8/2004 |
| JP | S52-029884 | 3/1977 |
| JP | S52029884 | 3/1977 |
| JP | 5-506268 A | 9/1993 |
| JP | H05506268 | 9/1993 |
| JP | H08-277302 A | 10/1996 |
| JP | H08277302 | 10/1996 |
| JP | 2939586 B1 | 8/1999 |
| JP | 2000-159801 A | 6/2000 |
| JP | 2000159801 | 6/2000 |
| JP | 2000-319566 A | 11/2000 |
| JP | 2000319566 | 11/2000 |
| JP | 2004-168798 A | 6/2004 |
| JP | 2004168798 | 6/2004 |
| JP | 2004-224887 A | 8/2004 |
| JP | 2004224887 | 8/2004 |
| JP | 2006-052338 A | 2/2006 |
| JP | 2006052338 | 2/2006 |
| JP | 2006-233160 A | 9/2006 |
| JP | 2006233160 | 9/2006 |
| JP | 2009-160572 A | 7/2009 |
| JP | 2009160572 | 7/2009 |
| JP | 2009-286922 A | 12/2009 |
| JP | 2009286922 | 12/2009 |
| JP | 2018-095781 A | 6/2018 |
| JP | 2018095781 | 6/2018 |
| WO | 92-13894 A1 | 8/1992 |
| WO | 93/22938 A1 | 11/1993 |
| WO | 2015/055734 A1 | 4/2015 |

OTHER PUBLICATIONS

Zhu et al., "Formulation and Manufacture of Fine Chemical Products (vol. V)", 1st edition, Jin Dun Publishing House, p. 183, Dec. 31, 2000.

Han et al., "Technical Manual for Practical Production of Fine Chemicals—Leather Textile and Paper Chemicals Manufacturing Technology", p. 660, Scientific and Technical Documentation Press, Nov. 30, 2004.

Resistant Starch Production Technology and Its Application, 1st edition, edited by Jihong Huang, Henan Science and Technology Press, p. 265.

International Search Report & Written Opinion from International Application No. PCT/EP2018/054113 dated Apr. 11, 2018.

Fringant et al., "Preparation of mixed esters of starch or use of an external plasticizer: two different ways to change the properties of starch acetate films"; Carbohydrate Polymers, 35 (1998) pp. 97-106.

* cited by examine

*Primary Examiner* — Patrick D Niland
(74) *Attorney, Agent, or Firm* — Greenberg Traurig, LLP

(57) ABSTRACT

The present invention concerns the use of starch derivatives, wherein the starch derivative is partially acetylated and partially acylated with at least one fatty acid, as additive in coating compositions, and starch derivatives which are partially acetylated and partially acylated with at least one fatty acid at least one fatty acid, wherein the MW of the starch derivatives is from 3.000 to 50.000 g/mol.

10 Claims, No Drawings

ACYLATED STARCH DERIVATIVES AND USE THEREOF

RELATED APPLICATIONS

This application is a national phase filing under 35 U.S.C. § 371 of International Application No. PCT/EP2018/054113, filed on Feb. 20, 2018, which claims priority to and benefit of European Patent Application No. 17158413.9, filed on Feb. 28, 2017, and European Patent Application No. 17162614.6, filed on Mar. 23, 2017, the entire contents of which are herein incorporated by reference.

DESCRIPTION

The present invention concerns the use of starch derivatives, wherein the starch derivative is partially acetylated and partially acylated with at least one fatty acid, as additive in coating compositions, and starch derivatives which are partially acetylated and partially acylated with at least one fatty acid at least one fatty acid, wherein the MW of the starch derivatives is from 3.000 to 50.000 g/mol.

Acylated starch derivatives are important processed renewable raw materials which can be used in a wide range of industrially applied polymers. They can be applied for example in solvent cast films (B. Y. Yang et al, Starch, 2008, 60, 146-158). Starch derivatives are recognized as renewable, non-toxic additives for a plurality of industrial applications, and there is an ongoing need to further develop uses for such derivatives and new derivatives in order to optimize exploitation of the industrial potential of such derivatives.

It was found that coating compositions comprising as additive starch derivatives, wherein the starch derivative is partially acetylated and partially acylated with at least one fatty acid, can exhibit valuable enhanced properties, such as improved adhesion on plastics such as poly(ethylene terephthalate) (PET), polypropylene (PP) or polyethylene (PE), metal surfaces or hybrid surfaces (e.g. electronic parts) while maintaining or enhancing other performance parameters of the plastics and/or coating. Other properties achieved can include improved flexibility of the coating, matting and anti-fingerprint effect. Water resistance of coatings can be improved, even in seawater. Water repellence of coatings can be increased, while water uptake can be decreased. The solubility of the starch derivative in different solvents can be tailored in the starch derivatives according to the invention.

It is thus the object of the present invention to provide uses of starch derivatives, wherein the starch derivative is partially acetylated and partially acylated with at least one fatty acid, as additive in coating compositions. It is another object of the present invention to provide derivatives which are partially acetylated and partially acylated with at least one fatty acid at least one fatty acid, wherein the MW of the starch derivatives is from 3.000 to 50.000 g/mol.

In the present specification, the plural form and the singular form are used interchangeably. Thus, it should be understood that the plural form also includes the singular form and vice-versa, unless otherwise indicated herein or clearly contradicted by context. For example, "starch" denotes a single starch from a single source, amylopectin/amylose composition and/or modification as well as a mixture of two or more starches of different sources, amylopectin/amylose compositions, modifications etc.

The starch derivatives according to the present invention are generally obtained by acylation of starches. In the following, the starches which form the source or starting material of the starch derivatives according to the present invention are described.

Starches comprising amylase and/or amylopectin generally can consist of isolated fractions of amylose or isolated fractions of amylopectin, or a mixture of amylose and amylopectin. Preferably, starch comprises essentially a mixture of amylose and amylopectin. Each of these materials are composed of D-glucose units linked to one another via a-(I-4) and a-(I-6) linkages, the latter being responsible for the branches in the structure of the molecule. The ratio between the amounts of amylose and amylopectin depends on the source of the polymer, e.g. starch. According to the present invention, the starches employed as source or starting material of the starch derivatives can comprise predominantly amylose or, conversely, predominantly amylopectin (waxy starch). Generally, whole starch and/or isolated fractions of amylose and/or isolated fractions of amylopectin can be used. The starches can be derived from any native source, wherein native relates to the fact that said starch is found in nature. Unless specifically distinguished, references to starch in this specification are meant to include their corresponding flours, which are still containing proteins, such as wheat gluten (hereinafter "starch"). In the present invention, a single or several starch sources can be used. The starch can also be combined out of several sources, isolated amylose fractions and/or amylopectin fractions, and/or derivatives like chemically or physically modified starch, which will be explained further below. Typical sources for the starches are cereals, tubers, roots, legumes, fruit starches and hybrid starches. Suitable sources include but are not limited to, millet, pea, potato, sweet potato, maize, sorghum, banana, barley, wheat, rice, sago, amaranth, tapioca, arrowroot and cannay. Preferred sources according to the present invention are selected from the group consisting of tubers, legumes or cereals. Even more preferably, the starch source is selected from the group consisting of pea, potato, sweet potato, wheat and maize. Most preferably, pea or waxy maize is used as starch source. Also suitable are starches derived from a plant obtained by breeding techniques including crossbreeding, translocation, inversion, transformation or any other method of gene or chromosome engineering to include variations thereof.

In another embodiment of the present invention, the one or more starches which are the source or starting material of the starch derivatives according to the invention are is chemically and/or physically modified.

"Chemically modified starch" is intended to denote in particular the partial chemical modification of the hydroxyl-groups in amylose and/or amylopectin. Generally, chemically modified starches which can be selected as starting material according to the present invention can be classified as cross-linked starches, partially acetylated starches, partially etherified starches like hydroxyethylated, hydroxypropylated and methylated starches, inorganically esterified starches, cationic, anionic (like carboxymethyl starch), oxidized starches, zwitterionic starches, starches modified by enzymes. The preferred chemically modified starch is a partially hydroxypropylated starch.

In one embodiment of the present invention, the modified starch is maltodextrin. "Physically modified starch" is intended to denote a starch that has been modified by a physical method. Generally, physical methods for the modification of starch include heat treatment, heat-moisture treatment, annealing, retrogradation, freezing, mechanical treatment, ultra high pressure treatment, gelatinization, glow discharge plasma treatment and osmotic pressure treatment.

According to the present invention, mixtures of any of the above mentioned starches, modified starches and/or flours, derived from any source, are also within the scope of this invention. For the sake of simplicity, the expression "starch" is intended to denote equally any of the starches; modified starches, flours and or/their mixtures, derived from any source with any amylopectin/amylose ratio.

According to the use of the present invention, the starch derivatives are partially acetylated and partially acylated with at least one fatty acid. The chemical building blocks of starch, in particular amylose and amylopectin, are anhydroglucose units which feature free hydroxylic groups. Derivatization of the free hydroxylic groups, for example by esterification, is measured by the "degree of substitution" (DS). The degree of substitution indicates the average number of hydroxyl groups on each anhydroglucose unit which are derivatized by substituent groups. In theory, the maximum obtainable DS value for starch is 3, indicating that all 3 hydroxylic groups of an anhydroglucose unit in the starch derivative are derivatized.

The present invention concerns the use of starch derivatives, wherein the starch derivative is partially acetylated and partially acylated with at least one fatty acid, as additive in coating compositions. The term «partially acetylated» intends to denote that at least a fraction of the hydroxylic groups of the anhydroglucose units in the starch are acetylated with the group —C(O)$C_2H_5$, for example by reaction of the hydroxylic groups with acetic anhydride. The term «partially acylated with at least one fatty acid» intends to denote that at least a fraction of the hydroxylic groups of the anhydroglucose units in the starch are acetylated, thus, esterified, with at least one fatty acid. The use of the starch derivative as an additive in UV-curing compositions is preferred. In one aspect, the UV-curing composition is a coating composition for treatment of wood, plastics or metal surfaces, such as wood lacquers. In another aspect, the use of the starch derivative an additive in UV-curing printing inks is preferred. One or more starch derivatives can be used in the same composition.

When the UV-curing composition is an ink for use on plastic or paper surfaces, preferably plastic surfaces, it can be preferred that the starch used for acetylation and acylation with at least one fatty acid is a chemically modified starch, in particular a hydroxypropylated starch. The use of such as starch can enhance the adhesion properties of the ink to the treated surface.

The term «fatty acid» intends to denote carboxylic acid with an aliphatic chain of from 4 to 28 carbon atoms, which is either saturated or unsaturated. Fatty acids can have a branched or straight aliphatic chain. Preferred according to the present invention are fatty acids with an aliphatic chain of from 12 to 18 carbon atoms, which may be unsaturated or saturated. More preferably, the at least one fatty acid is selected from the group consisting of lauric acid, oleic acid, linolenic acid, linoleic acid, palmitic acid, palmitoleic acid, stearic acid and myristic acid. Palmitic acid, oleic acid and stearic acid are most preferred in the starch derivatives according to the present invention.

The starch derivatives used as additives can be derivatized with one or more, for example one, two, three or four, preferably one or two, fatty acids.

The starch derivatives for use according to the present invention are partially acetylated. This denotes that the hydroxylic groups of the anhydroglucose unit are partially esterified with an acetyl group. The $DS_{(acetyl)}$ can be, for example, from 1.4 to 2.85. Generally, the $DS_{(acetyl)}$ is from equal to or more than 1.4, preferably equal to or more than 1.6 and more preferably equal to or more than 1.8. Generally, the $DS_{(acetyl)}$ is from equal to or less than 2.85, preferably equal to or less than 2.65 and more preferably equal to or less than 2.5. A $DS_{(acetyl)}$ of from 1.8 to 2.85 often is most preferred. The DS is determined by NMR spectroscopy. The samples are, for example, peracylated and measured in CDCb at 500 MHz in a Bruker NMR spectrometer after calibration of the samples to the solvent peak. A procedure for the measurement is described in M. C. V. Nagel et al, Lenzinger Berichte 2012, p. 85-92.

The starch derivatives for use according to the present invention are partially acylated with at least one fatty acid. This denotes that the hydroxylic groups of the anhydroglucose unit are partially esterified with at least fatty acid. The combined $DS_{(fatty\ acid)}$ can be, for example, from 0.01 to 1.2. Generally, the DS from equal (fatty acid) is to or more than 0.01, preferably equal to or more than 0.05 and more preferably equal to or more than 0.1. Generally, the $DS_{(fatty\ acid)}$ is from equal to or less than 1.2, preferably equal to or less than 0.5 and more preferably equal to or less than 0.3. A $DS_{(fatty\ acid)}$ of from 0.1 to 0.3 often is most preferred. The DS is determined as described above.

It is understood that the $DS_{(acetyl)}$ and the $DS_{(fatty\ acid)}$ in sum do not exceed the theoretically possible value of 3. Generally, it can be preferred that the sum of the DS values is 2.7 or less.

The starch derivatives for use according to the present invention can be obtained, for example, by esterification of a partially acetylated starch with a fatty acid derivative. Partially acetylated starch can be obtained, for example, as described in WO2015/055734, WO2015/055742 and WO2015/055741, the contents of which are hereby incorporated in their entirety. The partially acetylated starch is then reacted with a fatty acid, preferably its activated derivative. On example for an activated fatty acid derivative is a fatty acid reacted with N,N-carbonyldiimidazol, which forms a fatty acid imidazol derivative, which reacts with free hydroxylic groups in the acetylated starch. The starch can also first be reacted with a fatty acid derivative, such as a fatty acid chloride, and then reacted with an acetylating agent, such as acetic acid anhydride. Such a reaction is described for example in Y. Tan, Chem. Commun., 2010, 46, 4523-4525 (Suppl. Information). The starch derivatives can also be esterified with an acetylating agent, such as acetic anhydride, and a fatty acid or its derivative, simultaneously, for example as described in C. Fringant et al, Carbohydrate Polymers, 35 (1998), 97-106 and literature cited therein. The $DS_{(fatty\ acid)}$ and A $DS_{(acetyl)}$ can be appropriately selected through the reaction conditions, stoichiometry, reagents and potentially intermediate or final partial saponification to adjust DS values.

The starch derivatives for use according to the present invention generally have a $T_g$ from 30° C. to 130° C. Often, $T_g$ is from equal to or more than 30° C., preferably equal to or more than 35° C. and more preferably equal to or more than 40° C. Generally, the $T_g$ is from equal to or less than 130° C., preferably equal to or less than 120° C. and more preferably equal to or less than 110° C. A $T_g$ of from 60° C. to 105° C. often is most preferred. The term $T_g$ denotes the glass-transition temperature. $T_g$ is second-order transition in which a supercooled melt yields, on cooling, a glassy structure. Below the glass-transition temperature the physical properties vary in a manner similar to those of the crystalline phase. The $T_g$ is determined according to methods known to the person skilled in the art; for this invention, DSC was used, using two heating cycles in a DSC7 (Perkin Elmer), and Pyris Manager Software for determination of the values.

The starch derivatives for use according to the present invention generally have a molecular weight MW from 3.000 to 50.000 g/mol. Often, MW is from equal to or more than 3.000 g/mol, preferably equal to or more than 3.200 g/mol and more preferably equal to or more than 3.500 g/mol. Generally, the MW is from equal to or less than 50.000 g/mol, preferably equal to or less than 40.000 g/mol and more preferably equal to or less than 30.000 g/mol. A MW of from 3.500 to 10.000 g/mol often is most preferred. The term MW relates to the molecular weight of the starch derivative. The MW is determined according to methods known to the skilled person, for example using GPC (Gel permeation chromatography), for example by using a SDV LIN XL column (at 35° C. in $CHCl_3$:MeOH 10:1 v/v). According to the invention, starch derivatives, wherein the starch derivative is partially acetylated and partially acylated with at least one fatty acid, are used as additive in coating compositions. The starch derivatives can be used as binders, either as single binder or as additive to other binders, such as cellulose acetate butyrate (CAB). The starch derivatives for according to the present invention, when use as additive in coating compositions, can display a broader range of solubility in organic solvents, less water uptake, stronger hydrophobic behaviour, increased water resistance compared to starch derivatives with only acetylating groups, increased compatibility to other raw materials, increased flexibility of the coating upon mechanic stress (bending, scratching), adjustable $T_g$, good adhesion to surfaces such as PE, PET, PP, metal or hybrid surfaces such as electronic components, e.g. chips. Often, the use of plasticizers in a coating can be decreased or dispensed with when the starch derivatives are used as additives in a coating, increasing technical applicability and decreasing concerns in health and environment aspects. The coating compositions generally comprise from 3 to 35 w % of at least one starch derivative, wherein the starch derivative is partially acetylated and partially acylated with at least one fatty. Often, the coating compositions comprise equal to or more than 3 w %, preferably equal to or more than 5 w % or even 7 w % of starch derivatives partially acetylated and partially acylated with at least one fatty acid. Generally, the coating compositions comprise equal to or less than 35 w %, preferably equal to or less than 30 w % or even 28 w % of starch derivatives partially acetylated and partially acylated with at least one fatty acid. In some applications, coating compositions comprise from 22 to 35 w %.

The use of starch derivatives, wherein the starch derivative is partially acetylated and partially acylated with at least one fatty acid, in coating compositions is particularly advantageous when used as additive in UV-curing coating compositions, even more preferably UV-curing printing inks. UV curing is a chemical process of converting a prepolymer or a polymer into a polymer of higher molar mass and then into a network, wherein the curing is induced by photo-irradiation in UV light. UV curable coating compositions have a high value due to the speed by which the coatings, in particular inks, cure and products can be readied for further processing or packaging as opposed to physically drying coatings or chemically induced curing. Printing with UV curable inks provides the ability to print on a very wide variety of substrates such as plastics, paper, canvas, glass, metal, foam boards, tile, films, and many other materials. Other industries that take advantage of UV curing include medicine, automobiles, cosmetics (for example artificial fingernails and gel nail polish), food, science, education and art. In all of the foregoing applications, the addition of the starch derivatives partially acetylated and partially acylated with at least one fatty acid often improves flexibility, stress resistance, adaptability to gloss or matting properties with often superior results, and other properties while being fully compatible with the requirements of the compositions. Speeding up production by using UV curable coating compositions, in particular inks, can also reduce flaws and errors, as the amount of time that dust, flies or any airborne object has to settle upon the object is reduced. This can increase the quality of the finished item, and allow for greater consistency. The starch derivatives partially acetylated and partially acylated with at least one fatty acid often show an excellent solubility in acrylate monomers which are commonly used in UV curable coating compositions, in particular UV curable inks, such as acrylate monomers hexanediol diacrylate (HDDA), Tripropylene glycol diacrylate (TPGDA), Phenoxyethyl acrylate (PEA), Dipropylene Glycol Diacrylate (DPGDA), Trimethylolpropane triacrylate (TM PTA), Propoxylated Glyceryl Triacrylate (GPTA), dipentaerythritol monohydroxy pentacrylate (DIPEPA) and Di-TMPTA (Di-Trimethylol propane tetraacrylate). Compositions for UV curing can contain from 1 to 50 w % of starch derivatives partially acetylated and partially acylated with at least one fatty acid, and often from 3 to 35 w %. Generally, the UV coating compositions comprise equal to or more than 3 w %, preferably equal to or more than 5 w % or even 7 w % of starch derivatives partially acetylated and partially acylated with at least one fatty acid. Generally, the coating compositions comprise equal to or less than 35 w %, preferably equal to or less than 30 w % or even 28 w % of starch derivatives partially acetylated and partially acylated with at least one fatty acid. In some applications, coating compositions comprise from 22 to 35 w %.

The invention further concerns a cured coating comprising at least starch derivative which is partially acetylated and partially acylated with at least one fatty acid, such as a UV cured ink, and a product comprising a cured coating comprising at least starch derivative which is partially acetylated and partially acylated with at least one fatty acid, such as a paper, plastic, metal or hybrid product at least partially coated with a cured composition comprising at least starch derivative which is partially acetylated and partially acylated with at least one fatty acid. The cured coating generally comprises from 1 to 50 w % of the starch derivative which is partially acetylated and partially acylated with at least one fatty acid.

The invention also concerns a starch derivative which is partially acetylated and partially acylated with at least one fatty acid at least one fatty acid, wherein the MW of the starch derivative is from 3.000 to 50.000 g/mol.

Starches which are described above can be used as starting material for the starch derivatives according to the present invention. The starch derivatives according to the present invention can be obtained through methods as described above.

The starch derivatives according to the present invention have a molecular weight MW from 3.000 g/mol to 50.000 g/mol. Often, MW is from equal to or more than 3.000 g/mol, preferably equal to or more than 3.200 g/mol and more preferably equal to or more than 3.500 g/mol. Generally, the MW is from equal to or less than 50.000 g/mol, preferably equal to or less than 40.000 g/mol and more preferably equal to or less than 30.000 g/mol. A MW of from 3.500 to 10.000 g/mol often is most preferred. The MW is determined according to methods known to the skilled person, as described for example above, by GPC.

The starch derivatives according to the present invention are at least partially acylated with at least one fatty acid, wherein the at least one fatty acid is selected from the group consisting of C12-C18 fatty acids, wherein the fatty acids can be unsaturated or saturated fatty acids. The fatty acids defined above apply to the starch derivatives according to the present invention. They can be derivatized with one or more, for example one, two, three or four preferably one or two, fatty acids.

The starch derivatives according to the present invention are partially acetylated. This denotes that the hydroxylic groups of the anhydroglucose unit are partially esterified with an acetyl group. The $DS_{(acetyl)}$ can be, for example, from 1.4 to 2.85. Generally, the $DS_{(acetyl)}$ is from equal to or more than 1.4, preferably equal to or more than 1.6 and more preferably equal to or more than 1.8. Generally, the $DS_{(acetyl)}$ is from equal to or less than 2.85, preferably equal to or less than 2.65 and more preferably equal to or less than 2.5. A $DS_{(acetyl)}$ of from 1.8 to 2.85 often is most preferred. The DS is determined as described above.

The starch derivatives according to the present invention are partially acylated with at least one fatty acid. This denotes that the hydroxylic groups of the anhydroglucose unit are partially esterified with at least fatty acid. The combined $DS_{(fatty\ acid)}$ can be, for example, from 0.01 to 1.2. Generally, the $DS_{(fatty\ acid)}$ is from equal to or more than 0.01, preferably equal to or more than 0.05 and more preferably equal to or more than 0.1. Generally, the $DS_{(fatty\ acid)}$ is from equal to or less than 1.2, preferably equal to or less than 0.5 and more preferably equal to or less than 0.3. A $DS_{(fatty\ acid)}$ of from 0.1 to 0.3 often is most preferred. The DS is determined as described above.

The starch derivatives according to the present invention generally have a $T_g$ from 30° C. to 130° C. Often, $T_g$ is from equal to or more than 30° C., preferably equal to or more than 35° C. and more preferably equal to or more than 40° C. Generally, the $T_g$ is from equal to or less than 130° C., preferably equal to or less than 120° C. and more preferably equal to or less than 110° C. A $T_g$ of from 80° C. to 105° C. often is most preferred. $T_g$ and its determination is described above.

While the starch derivatives according to the present invention display excellent properties when use in additives for coating compositions, they also can show useful properties as additives in or basis for films, like deep drawn or solvent cast films. They can also be applied as biodegradable agrochemical coatings, coatings for pharmaceutical compositions, whitening agents in personal care, metal (such as iron) capturing agents in water filtration, mineral processing and pigment dispersant. The starch derivatives according to the present invention can also be supplied as solvent-based anticorrosion flexibilizer additive.

The starch derivatives according to the present invention or for use according to the present invention can also be further derivatized, for example with ether groups on further hydroxylic groups on the anhydroglucose units.

The invention concerns also a coating composition, in particular UV curable coating composition, comprising at least one starch derivative which is partially acetylated and partially acylated with at least one fatty acid. In a preferred aspect, the coating composition comprises at least one starch derivative which is a starch derivative according to the present invention.

Should the disclosure of any patents, patent applications, and publications which are incorporated herein by reference conflict with the description of the present application to the extent that it may render a term unclear, the present description shall take precedence.

In the context of the present invention, the term "comprising" is intended to include the meaning of "consisting of".

In the present invention, designations in singular are in intended to include the plural; "fatty acid" is intended to denote also "more than one fatty acid" or "a plurality of fatty acids".

EXAMPLES

Starch acetate with a $DS_{(acetyl)}$ of 2, 1 was prepared according to example 1 of WO2015055741, starting form waxy maize. Other starch acetates are prepared according to the similar procedure, starting from appropriate starch sources.

Example 1: 1-(1IH-imidazol-1-yl)hexadecan-1-one 15.8 g palmitic acid were solved in $CH_2Cl_2$ (290 mL). While stirring, 15 g N,N-carbonyldiimidazole (CDI, 1, 1 eq) were added at room temperature and stirred for 24 h. The mixture was extracted several times with $H_2O$, and the organic phase was dried over $MgSO_4$. After evaporation of the solvent, 17.7 g product (93%) of product were obtained.

Example 2

The starch acetate of DS 2, 1 was solved in DMSO (50% w/w), heated to 80° C. and the product of example 1 above was added in portions (0.34 eq in relation to the free hydroxyl groups of the starch acetate). The mixture was stirred for 4 hours. After cooling to room temperature, $H_2O$ was added until the product precipitated quantitatively.

Approximately half the volume of DMSO was needed for this effect. The solid was filtered, washed with water, dried in vacuo and washed in hexanes. The product was dried in at 70° C. A starch derivative with a $DS_{(acyl)}$=2.1, $DS_{(palmitic\ acid)}$=0.1, $T_g$=85° C. and MW=13.100 g/mol was obtained.

Example 3

Similar to the process of example 2, a product starting from waxy maize starch, was obtained $DS_{(acetyl)}$=2.5, $DS_{(mixed\ FA)}$<0.2 and MW=2973 g/mol was obtained (PA1). The mixture of fatty acids FA employed contained oleic acid, stearic acid, linolenic acid, palmitoleic acid and palmitic acid.

Example 4

Similar to the process of example 2, a product starting from pea starch, was obtained $DS_{(acetyl)}$=2.5, $DS_{(palmitic\ acid)}$=0.1 and MW=7850 g/mol was obtained (PA2).

Example 5 (Formulation for UV Coating)

| Formulation | Ref | 1 |
|---|---|---|
| Starch acetate derivative (of example PA2) | — | 22.2 w % |

| Formulation | Ref | 1 |
|---|---|---|
| LR8986 (epoxy oligomer, obtainable from BASF) | 67.2 w % | 51.7 w % |
| SR306 (Tripropyleneglycol diacrylate monomer from Sartomer) | 28.8 w % | 22.2 w % |
| Initiator 1 | 2 w % | 2 w % |
| Initiator 2 | 2 w % | 2 w % |

Initiator 1: Benzophenonp,
Initiator 2: 1-Hydroxycyclohexylphenylketon

Initiator 1 and initiator 2 were mixed. PA2 was solved at 50° C. in SR306 and added with stirring to the initiator mixture. LR8986 was added. The mixture was homogenized by stirring for about 5 to 15 minutes. If necessary, the mixture was left to sit unstirred to eliminate air bubbles.

The mixtures were applied by frame applicator BYK-5361 as 8 mil (0.2 mm) coatings to a steel surface and irradiated in a curing chamber (225 mW/cm² UV-A) until full curing was achieved. Irradiation time: 4 times 45 seconds.

The coatings were submitted to a pencil test according to the procedure ISO 15184 with a Wolf Kilburn Pencil Hardness tester.

| — | ref | 1 |
|---|---|---|
| Hardness | H | 3H |
| Thickness mil | 3.5 | 3.5 |

It was observed that the addition of the starch acetate derivative PA2 enhances the pencil hardness of the coating.

Example 6

The starch derivative obtained in example 2 (denoted as PA) was compared with a fatty acid unmodified starch acetate derivative (DS(acetyl)=2.4, MW=35.210 g/mol, denoted as SA). The formulation contained 50 w % PM acetate (1-Methoxy-2-propyl acetate), 10 w % PA or SA, 7 w % Paraloid B-66, 3 w % triethyl citrate and 30 w % MEK (methyl ethyl ketone). The formulations were applied on glass and steel test panels and air dried.

The table below summarizes the results obtained by immersing the samples into de-ionized water and NaCl solution. The sample treated with an acetyl/fatty acid starch derivative showed an improved performance, with 5 denoting excellent resistance as assessed by visual inspection of the sample (corrosion of treated surface), and 1 denoting particularly poor resistance.

| | De-ionized water | | | 5% NaCl in water | | |
|---|---|---|---|---|---|---|
| | 6 h | 24 h | 48 h | 6 h | 24 h | 48 h |
| SA | 5 | 4 | 2 | 5 | 4 | 2 |
| PA | 5 | 5 | 5 | 5 | 5 | 3 |

Example 7 (Test on Water Uptake at 21° C., 60% rH)

PA1 and PA2 were tested against a SA (waxy maize, DS 2, 4, MW=8000 g/mol) without fatty acid acylation. All starch derivatives were tested as neat pulverous substances treated after synthesis in a mortar.

| Time (h) | SA | PA1 | PA2 |
|---|---|---|---|
| 0 | 0.2 | 0.34 | 0.22 |
| 1 | 2.8 | 1.04 | 1.2 |
| 2 | 3.48 | 1.78 | 1.26 |
| 3 | 3.76 | 1.58 | 1.38 |
| 19.6 | 4.47 | 1.65 | 1.4 |
| 92.6 | 4.74 | 1.9 | 1.26 |

Water uptake is significantly reduced in the derivatives. Coatings comprising starch derivatives according to the present invention can display a reduced water uptake tendency and can have a reduced tendency to develop haziness. Coatings comprising starch derivatives according to the present invention can protect surfaces from humidity, in particular surfaces of electronic elements.

The invention claimed is:

1. A coating comprising:
an additive comprising:
at least one starch derivative,
wherein the at least one starch derivative is
partially acetylated, and
partially acylated with at least one fatty acid,
wherein the at least one fatty acid is at least one of palmitic acid, oleic acid, or any combination thereof;
wherein $T_g$ of the at least one starch derivative is 60° C. to 130° C.;
wherein the coating is an ultraviolet (UV)-curing composition.

2. The coating according to claim 1, wherein the UV-curing composition is an UV-curing printing ink.

3. The coating according to claim 1, wherein a degree of acetyl substitution of the at least one starch derivative, $DS_{(acetyl)}$, is 1.4 to 2.85.

4. The coating according to claim 1, wherein a degree of a combined $DS_{(fatty\ acid)}$ is 0.01 to 1.2.

5. A composition comprising:
a starch derivative,
wherein the starch derivative is partially acetylated and partially acylated with at least one fatty acid,
wherein the at least one fatty acid is at least one of palmitic acid, oleic acid, or any combination thereof,
wherein $T_g$ of the starch derivative is 60° C. to 130° C.,
wherein the starch derivative is ultraviolet (UV)-curable.

6. The composition according to claim 5, wherein a degree of acetyl substitution of the starch derivative, $DS_{(acetyl)}$, is 1.4 to 2.85.

7. The composition according to claim 5, wherein a degree of a combined $DS_{(fatty\ acid)}$ is 0.01 to 1.2.

8. A method comprising:
applying a coating comprising at least one starch derivative,
wherein the at least one starch derivative is partially acetylated and partially acylated with at least one fatty acid,
wherein the at least one fatty acid is at least one of palmitic acid, oleic acid, or any combination thereof;
wherein $T_g$ of the at least one starch derivative is 60° C. to 130° C.; and ultraviolet (UV)-curing the coating to obtain a cured coating.

9. A product comprising:
an ultraviolet (UV)-cured coating comprising at least one starch derivative,
  wherein the at least one starch derivative is partially acetylated and partially acylated with at least one fatty acid,
    wherein the at least one fatty acid is at least one of palmitic acid, oleic acid, or any combination thereof;
  wherein $T_g$ of the at least one starch derivative is 60° C. to 130° C.

10. A UV curable coating comprising:
at least one starch derivative,
  wherein the at least one starch derivative is partially acetylated and partially acylated with at least one fatty acid,
    wherein the at least one fatty acid is at least one of palmitic acid, oleic acid, or any combination thereof;
  wherein $T_g$ of the at least one starch derivative is 60° C. to 130° C.

\* \* \* \* \*